United States Patent
Thorup et al.

(10) Patent No.: US 8,843,508 B2
(45) Date of Patent: Sep. 23, 2014

(54) SYSTEM AND METHOD FOR REGULAR EXPRESSION MATCHING WITH MULTI-STRINGS AND INTERVALS

(75) Inventors: Mikkel Thorup, Florence, MA (US); Philip Bille, Albertslund (DK)

(73) Assignee: AT&T Intellectual Property I, L.P., Atlanta, GA (US)

( * ) Notice: Subject to any disclaimer, the term of this patent is extended or adjusted under 35 U.S.C. 154(b) by 516 days.

(21) Appl. No.: 12/643,367

(22) Filed: Dec. 21, 2009

(65) Prior Publication Data

US 2011/0153641 A1    Jun. 23, 2011

(51) Int. Cl.
  *G06F 7/00* (2006.01)
  *G06F 17/30* (2006.01)
  *G06F 7/02* (2006.01)

(52) U.S. Cl.
  CPC ............ *G06F 7/02* (2013.01); *G06F 2207/025* (2013.01)
  USPC .......................................... 707/769; 707/770

(58) Field of Classification Search
  None
  See application file for complete search history.

(56) References Cited

U.S. PATENT DOCUMENTS

| 7,260,558 | B1* | 8/2007 | Cheng et al. | 706/12 |
| 7,308,446 | B1* | 12/2007 | Panigrahy et al. | 1/1 |
| 7,346,511 | B2* | 3/2008 | Privault et al. | 704/255 |
| 7,493,305 | B2* | 2/2009 | Thusoo et al. | 1/1 |
| 2005/0228791 | A1* | 10/2005 | Thusoo et al. | 707/6 |
| 2005/0273450 | A1* | 12/2005 | McMillen et al. | 707/1 |
| 2008/0270342 | A1* | 10/2008 | Ruehle | 707/1 |
| 2008/0282352 | A1* | 11/2008 | Beddoe et al. | 726/25 |
| 2010/0076919 | A1* | 3/2010 | Chen et al. | 706/48 |

* cited by examiner

*Primary Examiner* — Alex Gofman
*Assistant Examiner* — Tuan A Pham (57) ABSTRACT

Improved matching of a regular expression in an input string. A system first identifies a number of substrings (k) in a regular expression of length (m). The system receives a stream of start states for each of the substrings generated according to a regular expression matching process and receives a stream of end occurrences generated according to a multi-string matching process. The system identifies all instances where an end occurrence of a particular substring matches a positive start state of the particular substring, and enters the instances as positive substring accept states in the regular expression matching process on the input string. In one aspect, the system is much more efficient when (k) is much less than (m). The system can match the regular expression based on a bit offset between the first and second stream.

14 Claims, 4 Drawing Sheets

SYSTEM AND METHOD FOR REGULAR EXPRESSION MATCHING WITH MULTI-STRINGS AND INTERVALS

BACKGROUND

1. Technical Field

The present disclosure relates to text pattern matching and more specifically to regular expressions with multi-strings and intervals.

2. Introduction

A regular expression specifies a set of strings formed by a pattern characters combined with concatenation, union (|), and kleene star (*) operators, e.g., (a|(ba))* is a string of a's and b's where every b is followed by an a. Given a regular expression R and a string Q, the regular expression matching problem is to decide if Q matches any of the strings specified by R. This problem is a key primitive in a wide variety of software tools and applications. Standard UNIX tools such as grep and sed provide direct support for regular expression matching in files. Perl, Ruby, and Tcl are just a few of the many languages designed to easily support regular expression matching. In large scale data processing applications, such as internet traffic analysis, XML querying, and protein searching, regular expression matching is often one main computational bottleneck. Longer, more complex regular expressions typically require increased processing, but may be necessary for solving real-world problems. Thus, the field of regular expression processing welcomes any performance or speed increase which would help in analyzing strings for particular patterns, especially for lengthy, complex regular expressions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Regular expression matching is a key task (and often computational bottleneck) in a variety of software tools and applications, such as the standard grep and sed utilities, scripting languages such as Perl, internet traffic analysis, XML querying, and protein searching. Regular expressions are a form of expressing patterns of characters for matching in a string. Regular expressions can combine characters with union, concatenation, and Kleene star operators. The length m of a regular expression is proportional to the number of characters. However, often the initial operation is to concatenate characters in fairly long strings, e.g., searching for certain combinations of words in a firewall log. As a result, the number k of strings in the regular expression is significantly smaller than m. The approach disclosed herein essentially replaces m (the length of the regular expression) with k (the number of strings or substrings) in the complexity bounds for regular expression matching. More precisely, after an O(m log k) time and O(m) space preprocessing of the expression, a system can match a regular expression in a string presented as a stream of characters in $$O\left(k\frac{\log w}{w} + \log k\right)$$

time per character, where w is the number of bits in a memory word. For large values of w, this corresponds to the previous best bound of $$O\left(m\frac{\log w}{w} + \log m\right).$$

Existing approaches to regular expression matching do not include a O(k) bound per character. The solution disclosed herein also efficiently handles character class interval operators C{x, y}. Here, C is a set of characters and C{x, y}, where x and y are integers such that 0≤x≤y, represents a string of length between x and y from C. These character class intervals generalize variable length gaps which are also frequently used for pattern matching in computational biology applications.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
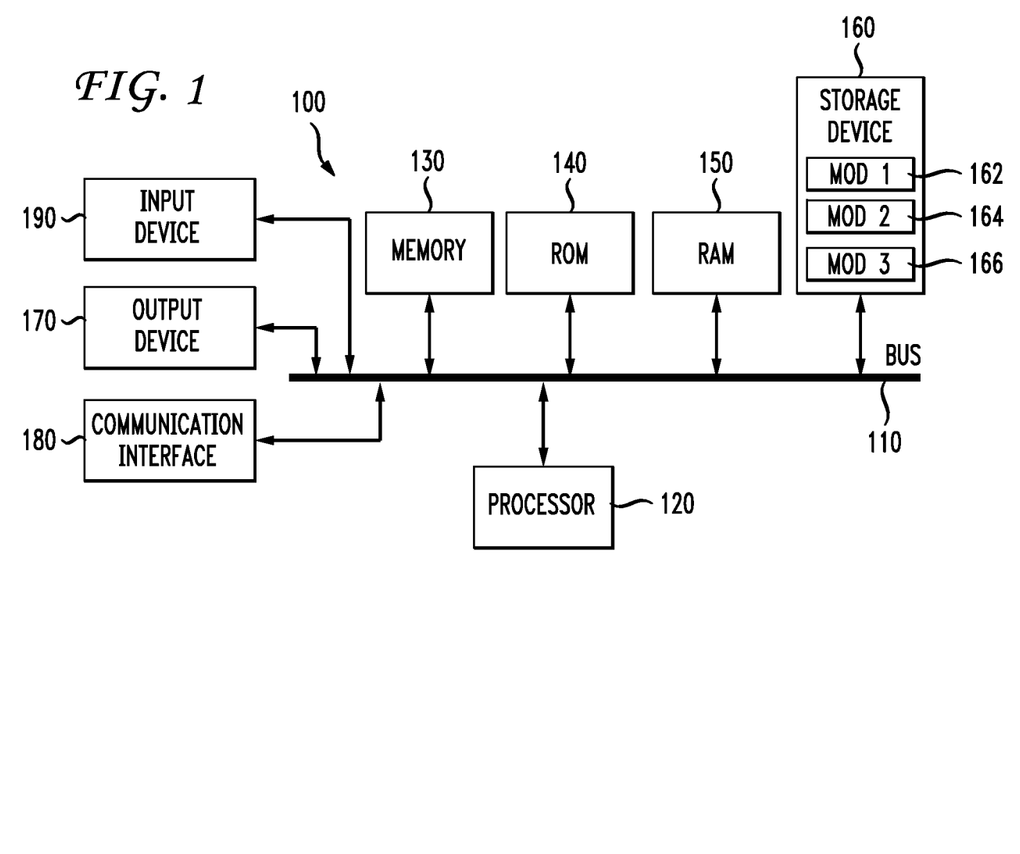
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

This disclosure addresses two basic issues in regular expression matching. The first issue is identifying a more efficient algorithm that exploits the fact that k is often far less than m. The second issue is identifying an algorithm for regular expression matching with character class intervals that is more efficient than simply using translation with an algorithm for the standard regular expression matching problem. With regards to the first issue, regular expression are often based on a comparatively small set of strings, directly concatenated from characters. As an example, consider the following regular expression used to detect a Gnutella data download signature in a stream, such as in a router log:

(Server:|User-Agent:)( |\t)*(LimeWire|BearShare|Gnucleus|
Morpheus|XoloX|gtk-nutella|Mutella|MyNapster|Qtella|
AquaLime|NapShare|Comback|PHEX|SwapNut|FreeWire|
Openext|Toadnode)

Here, the total size of the regular expression is m=174 (\t represents a single tab character) but the number of strings is only k=21.

Another example regular expression for evaluating the top level domain (TLD) of an email address (the .com, .edu, .org, etc.) is shown below:

[A-Z]
{2}|com|org|net|gov|mil|biz|info|mobi|name|aero|jobs|museum

Looking just at the top level domain (TLD) portion of the above regular expression, m=64, but the number of strings is only 13, counting the [A-Z]{2} as one string. That portion evaluates the different 2-letter national TLDs (such as .cn for China, .ru for Russia, .uk for Great Britain, and so forth). These are just a few examples of the innumerable practical applications for regular expression based pattern matching in strings of characters, including non-computer based strings.

A more efficient regular expression matching algorithm that exploits k<<m (k being much less than m) demonstrates the following theorem:

Theorem 1.1

Let R be a regular expression of length m containing k strings and let Q be a string of length n. On a unit-cost RAM regular expression matching can be solved in time $$O\left(n\left(k\frac{\log w}{w} + \log k\right) + m\log k\right) = O(nk + m\log k)$$

where Big-Oh (i.e. O(n)) notation indicates a particular algorithm's growth rate and, thus, efficiency in solving a given problem. This works as a streaming algorithm that after an O(m log k) time and O(m) space preprocessing can process each input character in $$O\left(k\frac{\log w}{w} + \log k\right)$$

time. This approach differs from those known in the art in that it replaces m with k.

This approach is an extension of the standard set of operators in regular expressions (concatenation, union, and kleene star). Given a regular expression R and integers x and y, $0 \leq x \leq y$, the interval operator R{x; y} is shorthand for the expression:

$$\overbrace{R \ldots R}^{x}\overbrace{(R \mid \varepsilon) \ldots (R \mid \varepsilon)}^{y-x}$$

at least x and at most y concatenated copies of R.

One important special case of character class intervals are defined as follows. Given a set of characters $\{\alpha_1, \ldots, \alpha_c\}$, the character class $C = \{\alpha_1, \ldots, \alpha_c\}$ is shorthand for the expression $\{\alpha_1, | \ldots |, \alpha_c\}$. Thus, the character class interval C{x, y} is shorthand for the following:

$$C\{x, y\} = \overbrace{(\alpha_1 \mid \ldots \mid \alpha_c) \ldots (\alpha_1 \mid \ldots \mid \alpha_c)}^{x} \cdot \overbrace{(\alpha_1 \mid \ldots \mid \alpha_c \mid \varepsilon) \ldots (\alpha_1 \mid \ldots \mid \alpha_c \mid \varepsilon)}^{y-x}$$

Hence, the length of the short representation of C{x, y} is O(|C|) whereas the length of C{x, y} translated to standard operators is $\Omega(|C|y)$.

With regards to the second issue of designing an algorithm for regular expression matching with character class intervals that is more efficient than simply using the above translation with an algorithm for the standard regular expression matching problem, the issue starts with a generalization of Theorem 1.1, as shown below:

Theorem 1.2

Let R be a regular expression of length m containing k strings and character class intervals and let Q be a string of length n. On a unit-cost RAM regular expression matching can be solved in time $$O\left(n\left(k\frac{\log w}{w} + \log k\right) + X + m\log m\right)$$

Here, X is the sum of the lower bounds on the lengths of the character class intervals. This works as a streaming algorithm that after an O(X+m log m) time and O(X+m) space preprocessing can process each input character in $$O\left(k\frac{\log w}{w} + \log k\right)$$

time.

Even without multi-strings this is the first algorithm to efficiently support character class intervals in regular expression matching.

The special case $\Sigma\{x, y\}$, in which character classes are identified by their corresponding sets, is called a variable length gap since it specifies an arbitrary string of length at least x and at most y. Variable length gaps are frequently used in computational biology applications. For instance, the PROSITE data base supports searching for proteins specified by patterns formed by concatenation of characters, character classes, and variable length gaps.

In general the variable length gaps can be lengthy in comparison with the length of the expression. For instance, see the following protein pattern:

MT•Σ{115,136}•MTNTAYGG•Σ{121,151}•GT-NGAYGAY

For various restricted cases of regular expressions some results for variable length gaps are known. For patterns composed using only concatenation, character classes, and variable length gaps, one algorithm uses $$O\left(\frac{m+Y}{w} + 1\right)$$

time per character, where Y is the sum of the upper bounds on the length of the variable length gaps. This algorithm encodes each variable length gap using a number of bits proportional to the upper bound on the length of the gap. One improvement for the case when all variable length gaps have lower bound 0 and identical upper bound y encodes each of such gaps using O(log y) bits and subsequently O(log log y) bits, leading to an algorithm using $$O\left(m\frac{\log\log y}{w} + 1\right)$$

time per character. The latter results are based on maintaining multiple counters efficiently in parallel. This disclosure introduces an improved algorithm for maintaining counters in parallel as a key component in Theorem 1.2. Inserting these counters into the algorithms described above lead to an algorithm using $$O\left(\frac{m}{w} + 1\right)$$

time per character for this problem. With counters this approach can even remove the restriction that each variable length gap should have the same upper bound. However, when k is less than m, the bound of Theorem 1.2 for the more general problem is better. The real-world benefits and efficiency savings when applying this approach over the traditional, known approaches scale with the difference between k and m such that when k is much less than m, this approach is very beneficial.

In order to achieve an O(nk+m log k) bound for regular expression matching. In order to achieve the speed up, the disclosure shows how to efficiently handle multiple bit queues of non-uniform length. For the character class intervals the algorithm can be further extended to efficiently handle multiple non-uniform counters. The techniques for non-uniform bit queues and counters are of independent interest.

Herein is provided a brief review the classical concepts of regular expressions and finite automata. The set of regular expressions over $\Sigma$ are defined recursively as follows: A character $\alpha \in \Sigma$ is a regular expression, and if S and T are regular expressions then so is the concatenation (S)•(T), the union (S)|(T), and the star (S)*. The language L(R) generated by R is defined as follows: $L(\alpha)=\{\alpha\}, L(S•T)=L(S)•L(T)$, that is, any string formed by the concatenation of a string in L(S) with a string in L(T), $L(S)|L(T)=L(S) \cup L(T)$, and $L(S^*)=\cup_{i \geq 0} L(S)^i$, where $L(S)^0=\{\epsilon\}$ and $L(S)^i=L(S)^{i-1}•L(S)$, for i>0. Here $\epsilon$ denotes the empty string. The parse tree T(R) for R is the unique rooted binary tree representing the hierarchical structure of R. The leaves of T(R) are labeled by a character from $\epsilon$ and internal nodes are labeled by either •, |, or *.

A finite automaton is a tuple $A=(V,E,\Sigma,\Theta, \Phi)$, where V is a set of nodes called states, E is a set of directed edges between states called transitions each labeled by a character from $\Sigma \cup \{\epsilon\}$, $\Theta \in V$ is a start state, and $\Phi \in V$ is an accepting state. Sometimes NFAs are allowed a set of accepting states, but this is not a required element as described in this disclosure. In short, A is an edge-labeled directed graph with a special start and accepting node. A is a deterministic finite automaton (DFA) if A does not contain any $\epsilon$-transitions, and all outgoing transitions of any state have different labels. Otherwise, A is a non-deterministic finite automaton (NFA). When dealing with multiple automatons, a subscript A denotes information associated with automaton A, e.g., $\Theta_A$ denotes the start state of automaton A.

Given a string Q and a path p in A, p and Q match if the concatenation of the labels on the transitions in p is Q. A accepts a string Q if there is a path in A from $\Theta$ to $\Phi$ that matches Q. Otherwise A rejects Q. Let S be a state-set in A and let a be $\alpha$ character from $\Sigma$, and define the following operations.

Move(S, $\alpha$): Return the set of states reachable from S through a single transition labeled $\alpha$ Close(S): Return the set of states reachable from S through a path of 0 or more $\epsilon$-transitions.

A sequence of Move and Close operations can test if A accepts a string Q of length n as follows. First, set $S_0 := $ Close($\{\Theta\}$). For i=1, . . . , n compute $S_i := $ Close(Move($S_{i-1}$, Q[i])). It follows inductively that $S_i$ is the set states in A reachable by a path from $\Theta$ matching the i-th prefix of Q. Hence, Q is accepted by A if and only if $\Phi \in S_n$.

Figure 3A:
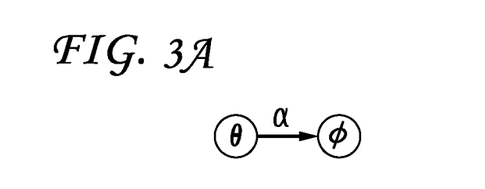
FIGS. 3A-3D illustrate various exemplary finite-state machines for evaluating regular expressions.
Figure 3B:
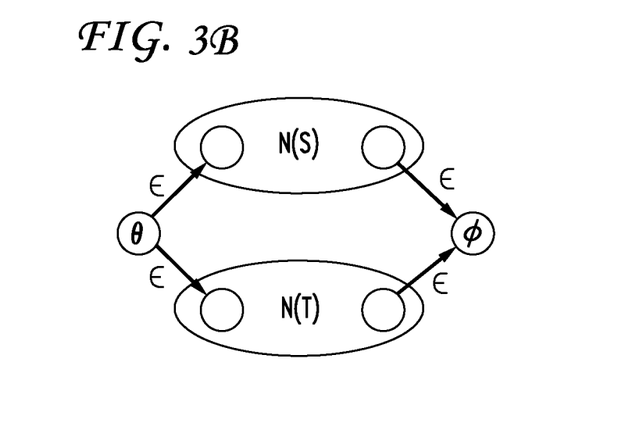
Figure 3C:
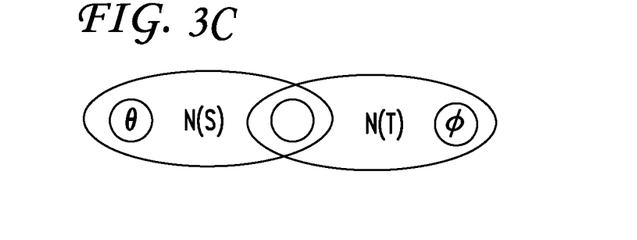
Figure 3D:
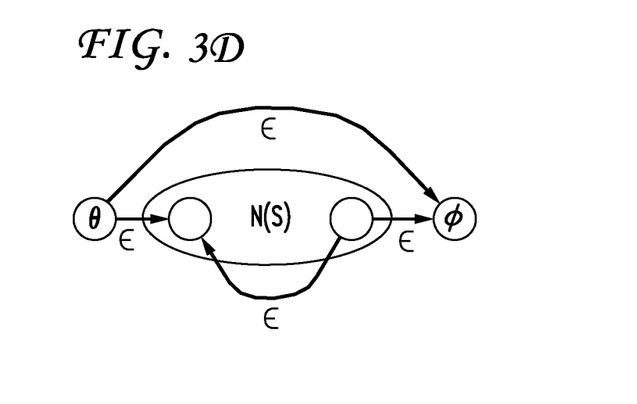
Figure 4A:
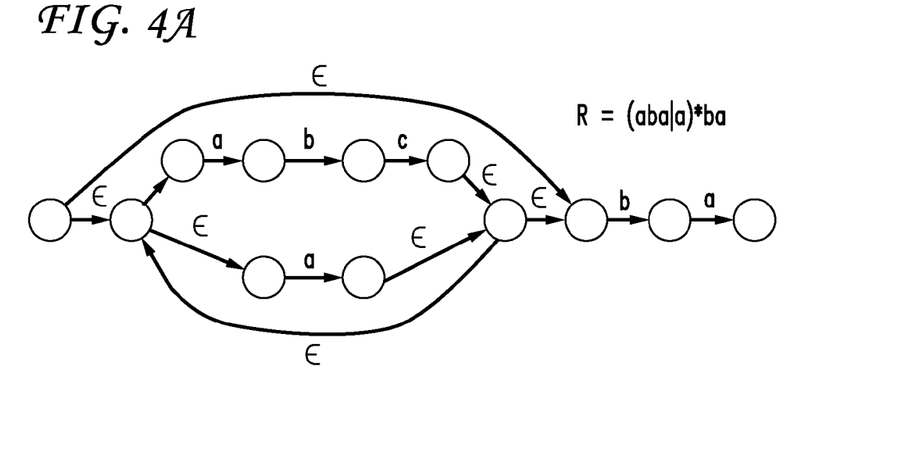
FIG. 4A illustrates an exemplary finite-state automaton for evaluating a regular expression R=(aba|a)*ba.

Given a regular expression R, an NFA A accepting precisely the strings in L(R) can be obtained by several classic methods. In particular, FIGS. 3A-D illustrate one simple well-known construction of a recursive NFA for evaluating regular expressions. In these figures, $\Theta$ is the start state and $\Phi$ is the finish state. Further, arcs labeled as $\epsilon$ (or epsilon) are "free" meaning that moving from one state to another over an $\epsilon$ arc is without cost. For example, FIG. 3A represents a simple regular expression matching a single character $\alpha$. FIG. 3B illustrates a chained series of substrings. In FIG. 3B, after the start state, the finite state machine matches a string N(S), and after N(S), matches a string N(T) to reach the finish state. FIG. 3C illustrates a parallel series of substrings. In FIG. 3C, from the start state, the first arc is an $\epsilon$ arc, so the state immediately goes to the beginning of N(S) and N(T). The first of N(S) or N(T) to match successfully reaches the finish state, meaning that the first instance of either satisfies the regular expression. FIG. 3D illustrates a finite state machine representing a more complicated regular expression. In FIG. 3D, the expression matches either 0 characters or any number of N(S) strings in a row. FIG. 4A illustrates the TNFA for the regular expression R=(aba|a)*ba. As shown in FIG. 4A, the initial start state location follows $\epsilon$ arcs to three places, the first a in aba, the single a, and the b in ba. If the character encountered is "a", then two of the three states shift to the b in aba, from the single a back to the single a, and the b in ba stays where it is because a b has not been encountered. This process continues along for a string of characters until a match is found or until the string of characters is exhausted without a match. In this case, the finite state automaton represented by (aba|a)*ba matches any string of characters ending in ba and optionally preceded by a string of a's and b's starting with an a and having no strings of consecutive b's.

In order to simplify the complex evaluation and state manipulations of FIG. 4A, the system can swap out the strings for single token representations. For example, aba, a, ba in FIG. 4A are replaced by 1, 2, 3 in FIG. 4B, respectively. While this is a simple example, in larger regular expressions where the number of substrings is much less than the number of characters, the benefits of this approach are much greater.

A TNFA N(R) for R has at most 2 m states, at most 4 m transitions, and can be computed in O(m) time. The Move operation on N(R) can be implemented in O(m) time by inspecting all transitions. With a breadth-first search of N(R) the Close operation can also be implemented in O(m) time. Hence, a regular expression checker can test acceptance of a string Q of length n in O(nm) time.

Given a set of pattern strings $P=\{P_1, \ldots, P_k\}$ of total length m and a text Q of length n, the multi-string matching problem is to report all occurrences of each pattern string in Q. In one approach for matching to multiple strings, an automaton for P, denoted AC(P), consists of the trie of the patterns in P. A trie, or prefix tree, is an ordered tree data structure that stores an associative array where the keys are strings. Hence, any path from the root of the trie to a state s corresponds to a prefix of a pattern in P. This prefix is denoted by path(s). For each state s there is also a special failure transition pointing to the unique state s' such that path(s') is the longest prefix of a pattern in P matching a proper suffix of path(s). Note that the depth of s0 in the trie is always strictly smaller for non-root states than the depth of s.

Finally, for each state s the system stores the subset occ(s) $\subseteq$ P of patterns that match a suffix of path(s). Since the patterns in occ(s) share suffixes occ(s) can be represented compactly by storing for s the index of the longest string in occ(s) and a pointer to the state s' such that path(s') is the second longest string if any. In this way occ(s) can be reported in O(|occ(s)|) time.

Figure 4B:
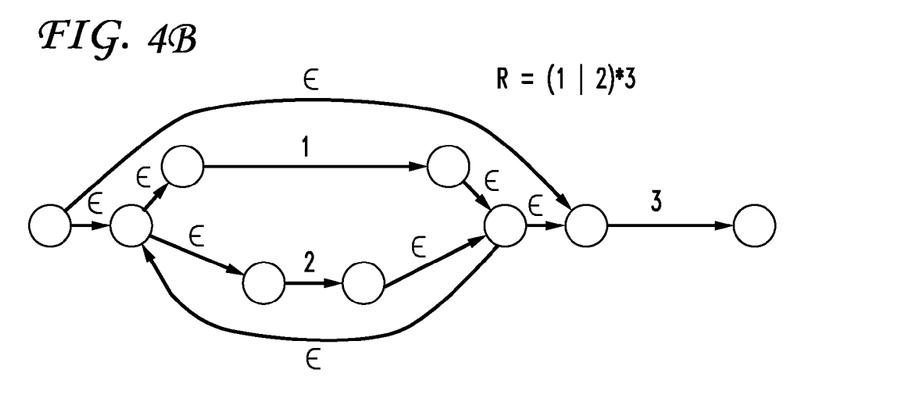
FIG. 4B illustrates an exemplary finite state automaton for evaluating a regular expression $\tilde{R}$=(1|2)*3.
Figure 4C:
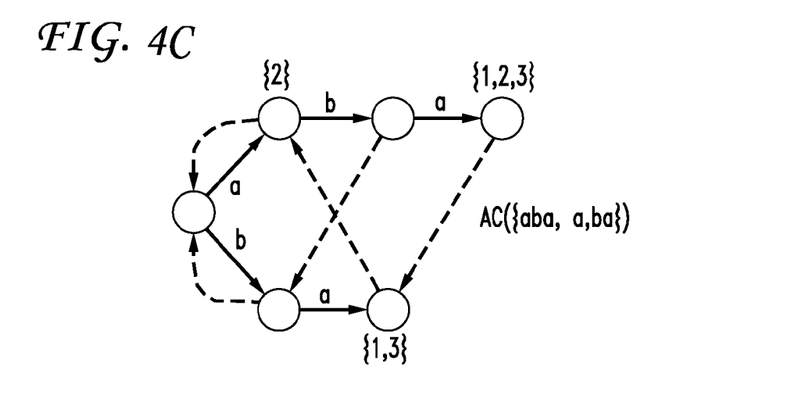
FIG. 4C illustrates an exemplary Aho-Corasick automaton (AC-Automaton) for evaluating the strings {aba,a,ba}.

The maximum outdegree of any state is bounded by the number of leaves in the trie which is at most k. Hence, AC(P) can be constructed in O(m log k) time and O(m) space using a standard comparison-based balanced search tree to index the trie transitions out of each state. FIG. 4C shows the AC-automaton for the set of patterns {aba, a, ba}. Here, the failure transitions are shown by dashed arrows and the non-empty sets of occurrences are listed by indices to the three strings.

For a state s and character $\alpha$ define the state-transition $\Delta$(s, $\alpha$) to be the unique state s' such that path(s') is the longest suffix that matches path (s)•$\alpha$. To compute a state-set transition $\Delta$(s, $\alpha$), first test if $\alpha$ matches the label of a trie transition t from s. If so, return the child endpoint of t. Otherwise, recursively follow failure transitions from s until finding a state s' with a trie transition t' labeled $\alpha$ and return the child endpoint of t'. If no such state exists return the root of the trie.

Each lookup among the trie transitions uses $O(\log k)$ time. One may use a sequence of state transitions to find all occurrences of P in Q as follows. First, set $s_0$ to be the root of AC(L). For i=1, ..., n, compute $s_i := \Delta(s_{i-1}, Q[i])$ and report the set $occ(s_i)$. Inductively, path(si) is the longest prefix of a pattern in P matching a suffix of the i-th prefix of Q. For each failure transition traversed in the algorithm, at least as many trie transitions must be traversed. Therefore, the total time to traverse AC(P) and report occurrences is $O(n \log k + occ)$, where occ is the total number of occurrences. Hence, this algorithm solves multi-string matching in $O((n+m) \log k + occ)$ time and $O(m)$ space.

Now, the disclosure turns to a comparison-based algorithm for regular expression matching using $O(nk + m \log k)$ time via a faster implementation of the algorithm leading to Theorem 1.1.

Recall that R is a regular expression of length m containing k strings $L = \{L_1, \ldots, L_k\}$. R is preprocessed in $O(m)$ space and $O(m \log k)$ time as described below. First, define the pruned regular expression $\tilde{R}$ obtained by replacing each string Li by its index. Thus, $\tilde{R}$ is a regular expression over the alphabet $\{1, \ldots, k\}$. The length of $\tilde{R}$ is $O(k)$. The principles disclosed herein can be advantageously applied in matching regular expressions over any alphabet, including alphanumeric, numeric, proteins, bit patterns, characters, English, foreign characters, and so forth. While most alphabets in regular expressions are at a character level, other alphabets can be expressed at a word level, phoneme level, logogram level, or ideogram level.

Given R, the system can compute $\tilde{R}$, the TNFA N($\tilde{R}$), and AC(L) using $O(m \log k)$ time and $O(m)$ space. For each string $L_i \in 2L$ define start($L_i$) and end($L_i$) to be the startpoint and endpoint, respectively, of the transition labeled i, in N($\tilde{R}$). For any subset of strings $L' \subseteq L$ define start($L'$)=$\cup_{L_i \in L'}$start($L_i$) and end($L'$)=$\cup_{L_i \in L'}$end($L_i$). FIG. 4B shows $\tilde{R}$ and N($\tilde{R}$) for the regular expression R=(aba|a)*ba. The corresponding AC-automaton for {aba, a, ba} is shown in FIG. 4C. The AC-automaton provides a stream of start states for substrings and a stream of states where the substrings were found. Using the length of the substring as an offset, the system can determine when a start state aligns with a found state. When they coincide (based on the offset), the system concludes that a substring match has been made at that position.

A set of First-in, First-out (FIFO) queues $F = \{F_1, \ldots, F_k\}$ associated with the strings in L can represent the interaction between N($\tilde{R}$) and AC(L). Queue $F_i$ stores a sequence of $|L_i|$ bits. Let $S \subseteq $ start(L) and define the following operations on F.

Enqueue(S): For each queue $F_i$ enqueue into the back of $F_i$ a 1-bit if start($L_i$) $\in$ S and otherwise a 0-bit.

Front: Return the set of states $S \subseteq $ end(L) such that end($L_i$) $\in$ S if the front bit of $F_i$ is 1.

Using a standard cyclic list for each queue the operations can be supported in constant time per queue. Both of these queue operations take $O(k)$ time. In all, these preprocessing operations require $O(m)$ space and $O(m \log k)$ time.

R can be matched to Q in $O(k)$ time per character of Q by computing a sequence of state-sets $S_0, \ldots, S_n$ in N($\underline{R}$) and a sequence of states $s_0, \ldots, s_n$ in AC(L) as follows. Initially, set $S_0 := $ Close($\{\Theta\}$), set $s_0$ to be the root of AC(L), and initialize the queues with all 0-bits. At step i of the algorithm, $1 \leq i \leq n$, perform the following steps:

1. Compute Enqueue($S_{i-1} \cap $ n start(L)).
2. Set $s_i := \Delta(s_{i-1}, Q[i])$.
3. Set S' := Front(F) $\cap$ end(occ($s_i$)).
4. Set Si := Close(S').

Finally, $Q \in L(R)$ if and only $\Theta \in S_n$. The sequence of bits in the queue corresponds to the states representing the strings in R within N(R). The queue and set operations take $O(k)$ time and traversing the AC-automaton takes $O(n \log k)$ time in total. Hence, the entire algorithm, including preprocessing, uses $O(nk + (n+m)\log k) = O(nk + m \log k)$ time. Note that all computation only requires a comparison-based model of computation, leading to the following result.

Theorem 3.1

Given a regular expression of length m containing k strings and a string of length n, regular expression matching can be solved in a comparison-based model of computation in time $O(nk + m \log k)$ and space $O(m)$.

The simple algorithm above can be made more efficient to perform matching in $O(k \log w/w + \log k)$ time per character. This approach is a modification of an algorithm that uses $O(m \log w/w + \log m)$ per character. The modification applies a Close operation directly to the TNFA N($\tilde{R}$) of the pruned regular expression. Another aspect speeds-up the FIFO bit queues of non-uniform length that represent the interaction between the TNFA and the multi-string matching.

The basic, unimproved algorithm has the following key features. Later the disclosure illustrates how to handle strings more efficiently. Initially, assume $m \geq w$. First, decompose N(R) into a tree AS of $O(\lceil m/w \rceil)$ micro TNFAs, each with at most w states. For each $A \in $ AS, each child TNFA C is represented by a start and accepting state and a pseudo-transition labeled $\beta \in \Sigma$ connecting these. A decomposition of N(R) can be constructed as described above inasmuch as the parse tree can be partitioned into subtrees to build the decomposition from the TNFAs induced by the subtrees.

Secondly, store a state-set S as a set of local state-set $S_A$, $A \in $ AS. SA can be represented compactly by mapping each state in A to a position in the range $[0, O(w)]$ and store $S_A$ by the bit string consisting of 1s in the positions corresponding the states in $S_A$. For simplicity, $S_A$ can be identified with the bit string representing it. The mapping is constructed based on a balanced separator decomposition of A of depth $O(\log w)$, which combined with some additional information allows us to compute local Move$_A$ and Close$_A$ operations efficiently. To implement Move$_A$ endpoints of transitions labeled by characters are mapped to consecutive positions. This is always possible since the startpoint of such a transition has outdegree 1 in TNFAs. Move$_A(S_A, \alpha)$ can be computed in constant time by shifting $S_A$ and &'ing the result with a mask containing a 1 in all positions of states with incoming transitions labeled $\alpha$. This idea is a variant of the classical Shift-Or algorithm. Close$_A$ can be implemented using properties of the separator decomposition to define a recursive algorithm on the decomposition. Using a precomputed mask combined with the mapping, the recursive algorithm can be implemented in parallel for each level of the recursion using standard word operations. Each level of the recursion is done in constant time leading to an $O(\log w)$ algorithm for Close$_A$.

Finally, use the local Move$_A$ and Close$_A$ algorithm to obtain an algorithm for Move and Close on N(R). To implement Move simply perform Move$_A$ independently for each micro TNFA $A \in $ AS using $O(|AS|) = O(m/w)$ time. To implement Close from Close$_A$ use the result that any cycle-free path of $\epsilon$-transitions in a TNFA that uses at most one of the back transitions from the kleene star operators. This approach can compute the Close in two depth-first traversals of the decomposition using constant time per micro TNFA, thereby using $O(|AS| \log w) = O(m \log w/w)$ time per character. For the case of m<w only one micro TNFA exists and the depth of the separator decomposition is log m, meaning that only O(log m) time per character is required. In general, the approach outlined herein requires O(m log w/w+log m) time per character.

The disclosure now turns to a discussion of how to improve the simple algorithm to perform matching in O(k log w/w+ log k) time per character. Initially, assume that k≥w. Consider the TNFA N($\tilde{R}$) for the pruned regular expression $\tilde{R}$ as defined above, which is decomposed into a tree $\tilde{A}S$ of O(k/w) micro TNFAs each with at most w states. State-sets can be represented using the same algorithm for the Close operation in step 4 shown above. Hence, step 4 takes O(|$\tilde{A}S$|log w)=O(k log w/w) time as desired. The remaining step only affect the endpoints of non-ε transitions and therefore the system can perform them independently on each A ∈ $\tilde{A}S$. This approach can be performed in O(log w) amortized time leading to the overall O(k log w/w) time bound per character.

Let A ∈ $\tilde{A}S$ be a micro TNFA with at most w states. Let $L_A$ be the set of $k_A$≤w strings corresponding to the non-ε labeled transitions in A. First, construct $AC(L_A)$. For each state s ∈ $AC(L_A)$, represent the set end(occ(s)) as a bit string of length x with a 1 in each position corresponding to the states end (occ(s)) in A. Each of these bit strings is stored in a single word. Since the total number of states for all AC-automata in $\tilde{A}S$ is O(m) the total space used is O(m) and the total preprocessing time is O(m log $\max_{A \in \tilde{A}S} k_A$)=O(m log w). Traversing $AC(L_A)$ on the string Q takes O(log $k_A$) time per character. Furthermore, end(occ(s)) in step 3 can be retrieved in constant time. The two ∩'s in steps 1 and 3 can be computed in constant time by a bitwise & operation. The following section shows how to implement the queue operations in O(log $k_A$)=O(log w) amortized time, giving a solution using O(k/w log w) time per character.

Let $F_A$ be the set of $k_A$≤w queues for the strings $L_A$ in A and let $l_1, \ldots, l_{k_A}$ be the lengths of the queues. Local queue operations can be supported with input and output state-sets represented compactly as a bit string. For simplicity, start($L_A$) is identified with end($L_A$) such that the input and output of the queue operation correspond directly. This is not a problem since the states are consecutively mapped and translations between them occur in constant time. Using the queue operations implementation above provides a solution using O(w) time per operation. The approach disclosed herein improves this such that a set of $k_A$≤w bit queues supports Front in O(1) time and Enqueue in O(log $k_A$)=O(log w) amortized time. To demonstrate this improvement, one example divides into $k'_A$ short queues of length less than 2 $k_A$ and another example divides $k''_A$ into long queues of length at least 2 $k_A$.

In the short queues example, let l≤2 $k_A$≤2 w be the maximal length of a short queue. Each short queue fits in a double word. The key idea is to first pretend that all the short queues have the same length l and then selectively move some bits forward in the queues to speed up the shorter queues appropriately. The example is first explained for a single queue implemented within a larger queue, with a follow up explanation showing how to efficiently implement it in parallel for O($k_A$) queues. l can be a power of 2.

Consider a single bit queue of length $l_j$≤l represented by a queue of length l. This approach moves all bits inserted into the queue forward by l−$l_j$ positions by inserting log l jump points $J^1, \ldots, J^{\log l}$. If the i-th least significant bit in the binary representation of l−$l_j$ is 1 the i-th jump point $J^i$ is active. When a bit b is inserted into the back of the queue all bits are moved forward and b is inserted at the back. Subsequently, for i=log l, . . . , 2, if $J_i$ is active, the bit at position $2^i$ is moved to position $2^{i-1}$. By the choice of jump points it follows that a bit inserted into the queue is moved forward by l−$l_i$ positions during the lifetime of the bit within the queue.

This example can be extended to operate in parallel. First, all of the $k'_A$ bit queues are represented in a combined queue F of length l implemented as a cyclic list. Each entry in F stores a bit string of length $k'_A$ where each bit represents an entry in one of the $k'_A$ bit queues. Each $k'_A$-bit entry is stored "vertically" in a single bit string. The jump points for each queue are computed and represented vertically using log l bit strings of length $k'_A$ with a 1-bit indicating an active jump point. Let $F^i$ and $F^{i-1}$ be entries in F at position $2^i$ and $2^{i-1}$ respectively. All bits in parallel from queues with active jump point at position $2^i$ are moved to position $2^{i-1}$ as follows:

Z := $F^i$ & $J^i$
$F^i$ := $F^i$ & ¬ $J^i$
$F^{i-1}$ := $F^{i-1}$ | Z

Here, the relevant bits are extracted into Z, removed from $F^i$, and inserted back into the queue at $F^{i-1}$. Each of the O(log l) moves at jump points takes constant time and hence the Enqueue operation takes O(log l)=O(log $k_A$) time. The Front operation is implemented in constant time by returning the front of F.

The long queues example considers the $k''_A$ long queues, each having a length of at least 2 $k_A$. The key idea is to represent the queues horizontally with additional buffers of size $k''_A$ in the back and front of the queue represented vertically. The buffers allow conversion between horizontal and vertical representations every $k''_A$ Enqueue operations using a fast algorithm for transposition.

First, each long queue $L_i$ is converted to an individual horizontal representation as a bit string over $\lceil l_i/w \rceil$ words. As usual, the representation is cyclic. Second, two buffers are added, one for the back of the queue and one for the front of the queue. These are cyclic vertical buffers like those used for the short queues, and each has capacity for $k''_A$ bits from each string. In the beginning, all bits in all buffers and queues are initialized to a single value, usually 0. The first $k''_A$ Enqueue operations are very simple because each just adds a new word to the end of the vertical back buffer. The system applies a word matrix transposition to obtain a word with $k''_A$ bits for the back of the queue for each queue $L_i$. Since $k''_A$≤w, the transposition takes O($k''_A$ log $k''_A$) time. In O($k''_A$) total time, the system enqueues the results to the back of each of the horizontal queues $L_i$.

In general, the system works in periods of $k''_A$ Enqueue operations. The Front operation simply returns the front word in the front buffer. This front word is removed by the Enqueue operation which also adds a new word to the end of the back buffer. When the period ends, the back buffer is moved to the horizontal representation as described above. Symmetrically, the front $k''_A$ bits of each $L_i$ are transposed to get a vertical representation for the front buffer. The total time spent on a period is O($k''_A$ log $k''_A$) which is O(log $k''_A$) time per Enqueue operation. The system can partition FA into short and long queues and apply the algorithm for the above cases. Note that the space for the queues over all micro TNFAs is O(m).

In summary, the approach and algorithm set forth above for regular expression matching spends O(m log k) time and O(m) space on the preprocessing. Afterwards, it processes each character in O(|$\tilde{A}S$| log w)=O(k/w log w) time. So far this assumes k≥w. However, if k<w, the system can just use k bits in each word, and with these reduced words, the above bound becomes O(log k). This completes the proof of Theorem 1.1.

Before addressing character class intervals, the discussion first turns to how to extend the special treatment of strings to more general automata within the same time bounds.

Let $B_1, \ldots, B_k$ be a set of black-box automata. Each black-box is represented by a transition in the pruned TNFA and each black-box accepts a single bit input and output. In the short queues and long queues examples, each black-box was an automata that recognized a single string and the approach outlined therein handles $k_A \le w$ such automata in $O(\log k_A)$ time using the bit queues and a multi-string matching algorithm. In this setting none of the black-boxes accepted the empty string and since all black-boxes were of the same type the approach could handle all of them in parallel using a single algorithm.

The algorithm can be modified to handle general black-box automata. First, if $B_i$ accepts the empty string the system adds a direct $\epsilon$-transition from the startpoint to the endpoint of the transition for $B_i$ in the pruned TNFA. With this modification the $O(k \log w/w + \log k)$ time Close algorithm outlined above works correctly. The system creates a bit mask for the startpoint and endpoints of each type with different types of black-boxes in order to extract the inputs bits for a given type independently of the other types. As before, the output bit positions can be obtained by shifting the bit mask for the input bits by one position.

Specifically, let A be a micro TNFA with $k_A \le w$ black-box automata of a constant number of types. If each type is simulated in amortized $O(\log k_A)$ time per operation, the total time for regular expression matching with the black-boxes is dominated by the time for the Close operation, resulting in the same time complexity as in Theorem 1.1. Now the disclosure turns to a discussion of how to handle $\le w$ character class intervals in amortized constant time. Using these as black-boxes as described above leads to Theorem 1.2.

This approach supports character class intervals $C\{x, y\}$ in the black-box framework described above. It is convenient to define the following two types: $C\{=x\}=C\{x, x\}$ and $C\{\le x\}=C\{0, x\}$. As set forth above, $C\{x, y\}=C\{=x\}C\{\le y-x\}$.

Recall that each character class C is identified by the set it represents. It is instructive to consider how to implement some of the simple cases of intervals. O(w) character classes, i.e. intervals of the form $C\{=1\}$, can be handled in constant time. For each character the system stores a bit string indicating which character classes it is contained in and &'s this bit string with the input bits and copies the result to the output bits.

Intervals of the form $\Sigma\{=x\}$ are closely related to the algorithm for multi-strings. In particular, suppose that a string matcher for the string $L_i$ determines if the current suffix of Q matches L and a black-box for $\Sigma\{=|L_i|\}$. To implement the black-box for $L_i$ the system copies the input to $\Sigma\{=|L_i|\}$ and passes the character to the string matcher for $L_i$. The output for $L_i$ is then 1 if the output of $\Sigma\{=|L|\}$ and the string matcher is 1 and otherwise false. In the previous section $\Sigma\{=|L_i|\}$ and the string matcher are implemented using bit queues of non-uniform length and a standard multi-string matching algorithm, respectively. Hence, $\Sigma\{=x\}$ can be implemented using a bit queue of length x.

$C\{=x\}$ can be implemented using a similar approach as above. The main idea is to think of $C\{=x\}$ as the combination of $\Sigma\{=x\}$ and "the last x characters all are in C." An algorithm for maintaining generic non-uniform counters is set forth below. These will also be useful for implementing $C\{\le x\}$.

Define a trit counter with reset (abbreviated trit counter) T with reset value l as follows. The counter T stores a value in the range [0, l]. The following sequence of operations can determine T>0. A reset sets T := l, a cancel sets T := 0, and a decrement sets T := T-1 if T>0.

Multiple trit counters can be implemented using word-level parallelism by coding the inputs with trits $\{-1, 0, 1\}$, where 1 is reset, 0 is decrement and $-1$ is cancel. Each of these trits can be coded with 2 bits. The output is given as a bit string indicating which trit counters are positive. The main challenge here is that the counters have individual reset values. The disclosure demonstrates how to implement the character class intervals using this result.

For $C\{\le x\}$ the system can use a trit counter T with reset value $x-1$. For each new character $\alpha$ the system gives T an input $-1$ if $\alpha \in C$. Otherwise, the system inputs the start state of $C\{\le x\}$ to T. The output of $C\{\le x\}$ is the output of T. Hence, the system outputs a 1 if a 1 was input no more than x characters ago and the input has not had a character outside of C.

To finish the implementation of $C\{=x\}$ the system needs to implement "the last x characters all are in C." For this the system uses a frit counter T with reset value $x-1$. For each new character $\alpha$ the system inputs a 1 if $\alpha \in C$ and otherwise inputs a 0. The output for $C\{=x\}$ is 1 if the output from $\Sigma\{=x\}$ is 1 and T=0. Otherwise, the output is 0. In other words, the output from $C\{=x\}$ is 1 if the system inputs a 1 x characters ago and all of the last x characters are in C.

An implementation of the required interaction between O(w) bit queues and trit counters in constant time is based on standard word-level parallelism operations. The amortized constant time algorithm for maintaining O(w) trit counters presented below leads to an algorithm for regular expression matching with character class intervals using $O(k \log w/w + \log k)$ per character.

Let $T_A$ be a set of $k_A$ trit counters with reset values $l_1, \ldots, l_{k_A}$. This section demonstrates that it is possible to maintain a set of $k_A \le w$ of non-uniform trit counters with reset in constant amortized time per operation. This can be shown by splitting the $k_A$ counters into a sequence of subcounters which can be efficiently manipulated in parallel. The first explanation of the algorithm is for a single trit counter T with reset value l. The algorithm lends itself to straightforward parallelization.

The trit counter T with reset value l is stored by a sequence of w subcounters $t_0, t_1, \ldots, t_{w-1}$, where $t_z \in \{0, 1, 2\}$. Subcounter $t_i$ represents the value $t_i 2^i$ and the value of T is $\Sigma_{0 \le i \ge o} t_i 2^i$. Note that the subcounter representation of a specific value is not unique. The initial configuration of T is defined to be the unique representation of the value l such that a prefix $t_0, \ldots, t_h$ of subcounters are all positive and the remaining subcounters are 0. To efficiently implement cancel operations, T will be either in an active or passive state. The output of T is 1 if T is active and 0 otherwise. Furthermore, at any given time at most one active subcounter can be either starting or finishing.

In each operation the system visits a prefix of the subcounters $t_0, \ldots, t_i$. The length of the prefix is determined by the total number of operations. Specifically, in operation o the endpoint i of the prefix is the position of the rightmost 0 in the binary representation of o, i.e., in operation $23=10111_2$ the system visits the prefix $t_0, t_1, t_2, t_3$ because the rightmost 0 is position 3. Hence, subcounter $t_i$ is visited every $2_i$ operations and hence the amortized number of subcounters visited per operation is constant.

Consider a concrete operation that visits the prefix $t_0, \ldots, t_i$ of subcounters. Recall that h is the largest nonzero subcounter in the initial configuration and let z=min(i, h). These operations can be implemented as follows. If a cancel is received, the system sets T to passive. If a reset is received, the system resets the subcounters $t_0, \ldots, t_{z-1}$ according to the initial configuration. The new active subcounter will be $t_z$. If i<h, the system sets $t_z$ to starting; otherwise, z=h set it to finishing.

If a decrement is received, the system takes the following steps. If T is passive, do nothing. If T is active, let $t_a$ be the active subcounter. If i<a, do nothing. Otherwise, decrement $t_a$ by 1. There are two cases to consider:

1. $t_a$ is starting. The new active subcounter is $t_z$. If i<h, set t to starting and otherwise set it to finishing.

2. $t_a$ is finishing. The new active subcounter is $t_b$, where $t_b$ is the largest nonzero subcounter among $t_0, \ldots, t_a$. Set $t_b$ to finishing. If there is no such subcounter, set the T to passive.

This algorithm correctly implements a trit counter with reset value 1. The algorithm never decreases a subcounter below 0 in a sequence of decrements following an activation of the counter.

Initially, the first active subcounter is positive because it is in the initial configuration. When an active subcounter in the decrement operation is chosen, there are two cases to consider. If the current active subcounter $t_a$ is finishing the algorithm selects the next active subcounter to have a positive value. Hence, suppose that $t_a$ is starting and $t_h$ is never starting. Furthermore, if a=z then $t_a$ cannot be starting. Hence, a<min(h, i)=z and therefore the new active subcounter $t_z$ is positive. Inductively, it follows that a subcounter is never negative.

The initial configuration represents the value 1. Whenever a subcounter $t_i$ is decremented, there have been exactly $2_i$ operations since the last decrement operation. If a cancel operation input is not received, the trit counter becomes passive when all subcounters are 0. It follows that the algorithm correctly implements a trit counter.

It remains to implement the algorithm for $k_A \leq w$ trit counters efficiently. To do so, each level of the subcounters is represented vertically in a single bit string, i.e., all the $k_A$ subcounters at level i are stored consecutively in a single bit string. Similarly, the state (passive, active, starting, finishing) of each subcounter is represented vertically. Finally, the system stores the state (passive or active) of the $k_A$ trit counters in a single bit string. In total the system uses $O(k_A w)$ bits and therefore the space is $O(k_A)$. With this representation, the system can now read and write a single level of subcounters in constant time.

The input to the trit counters is given compactly as a bit string and the output is the bit string representing the state of all trit counters. Using a constant number of precomputed masks to compare and extract fields from the representation and the input bit string the algorithm is now straightforward to implement using standard word-level parallelism operations in constant time per visited subcounter level. Because an amortized constant number of subcounter levels is visited in each operation, this section demonstrates that it is possible to maintain a set of $k_A \leq w$ of non-uniform trit counters with reset in constant amortized time per operation.

Figure 2:
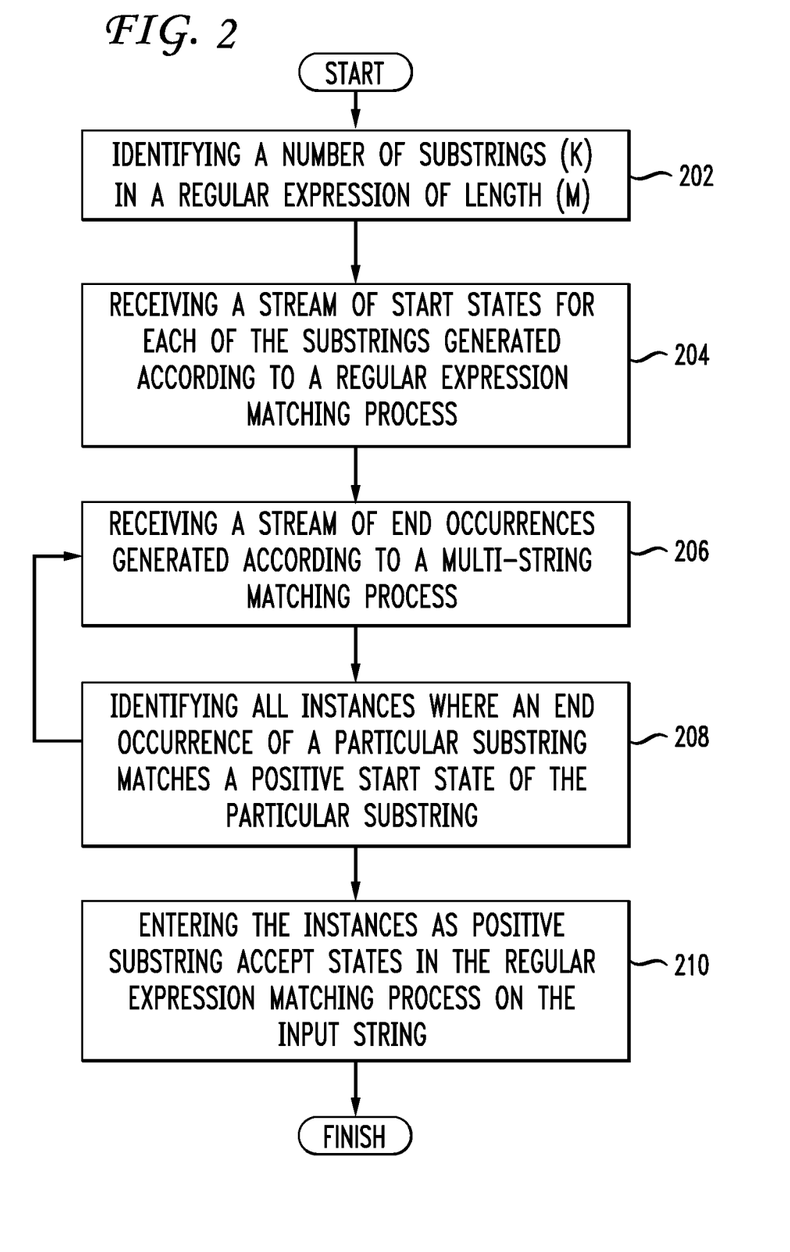
FIG. 2 illustrates an example method embodiment.

Having disclosed some basic system components, fundamental regular expressions principles, and variations thereon, the disclosure now turns to the exemplary method embodiment shown in FIG. 2. For the sake of clarity, the method is discussed in terms of an exemplary system 100 such as is shown in FIG. 1 configured to match a regular expression in an input string. The regular expression and/or the input string can include one or more of alphanumeric characters, punctuation, protein strings, and/or virtually any other characters or groups of characters. The system 100 first identifies a number of substrings (k) in a regular expression of length (m) (202). Consider the simple example regular expression (woman|man)kind The regular expression has a length (m) of 15 characters, but a number of substrings (k) of 3. The efficiency and/or speed benefit of this approach increase as the difference between (m) and (k) increases.

If (k) is less than (m), the system 100 receives a stream of start states for each of the substrings generated according to a regular expression matching process (204) and receives a stream of end occurrences generated according to a multi-string matching process (206). An end occurrence of one substring can lead to another substring start state or to the one substring start state. The first and second stream develop in parallel, one input character at a time, in a regular expression matching process. The system identifies all instances where an end occurrence of a particular substring matches a positive start state of the particular substring (208). The system 100 then enters the instances as positive substring accept states in the regular expression matching process on the input string (210). The first input string of start states for a substring and the output string of accept state may not be in a simple input-output relation. The accept state of one string can, via epsilon transitions, lead to the start state of another substring, or, via loops, to the same substring. All the state streams develop in parallel, one input character at the time, interacting via the regular expression matching process. The second input stream of substring occurrences in the input is, however, independent. The specifics of how the streams interrelate to each other depend on the structure, content, and form of the specific regular expression.

As shown in FIG. 2, the system 100 can incorporate a feedback loop between steps 208 and 206 because the output stream of accept states found for one substring can impact the input stream of start states. The output or accept state from one substring can create the input for another or even for itself in a loop, as in the case of an iteration like (ab)*. In the example below of "(woman|man)kind", the accept state of the first portion "(woman|man)" is the start state of "kind".

Multi-string matching locates all occurrences of the substrings in the input string by returning, for each substring, all the places that it ends or, conversely, for each position of the input string, all substrings ending in this position. The multi-string matching has nothing to do with the states as in regular expression matching. The approach set forth herein combines these occurrences found by multi-string matching approaches (embodied as a first stream) with knowledge of the start states (embodied as a second stream) to find the accept states.

The streams can be bit streams. The first and/or second stream can be represented as a finite state automaton. The start state stream depends on the preceding accepts. The system generates and combines these streams one character at a time. For example, consider matching the example regular expression above "(woman|man)kind" to the string "womankind" While this example illustrates a 1 as a positive match, the bit streams can easily be inverted. The system starts in a global start state and moves through a ε arc to start states for substrings "woman" and "man". The system can not start matching the substring "kind" until it accepts one of "woman" or "man". Exemplary first streams are shown below:

| woman | 1000000000 |
|-------|------------|
| man   | 1000000000 |
| kind  | 0010000000 |

To match things up correctly, the system considers states as being between characters. When the system reads a character, it moves to the state ready for reading the next character. Further, the start states are actually just before reading the first character. With this in mind, exemplary second streams are shown below:

| | |
|---|---|
| woman | 0000010000 |
| man | 0000010000 |
| kind | 0000000001 |

In order to further ensure that start and accept states match up nicely, streams can include an initial 0 indicating that the system hadn't ended anything before starting. The second stream indicates where the substrings end, regardless of the states of the regular expression matching. The system processes the string character by character in this example. When the system reads the 5$^{th}$ character, for woman the first stream is 100000 and the second stream is 000001. Thus, the system can deduce that it reached an accept state for "woman" and the accept stream for "woman" becomes 000001. For "man", the system has the same first and second stream, but since the substring "man" only has length 3, the system does not accept that substring, so the accept stream for "man" just becomes 00000.

Because the system accepts the string "woman" or "man" (in this case, "woman"), the system moves, via an ϵ arc to a start state for "kind", so its first stream after the first 5 characters is 000001. Now the system reads kind and when the second string gives a final 1, the system determines that it matches the start state for kind, thus leading to an accept state for "kind", which via an ϵ transition leads to a global accept state.

As a summary, the streams for "man", "woman", and "kind" are shown below:

man
(the wrong distance between substring start state and end occurrences leads to no accepts)

| | |
|---|---|
| Start stream | 1000000000 |
| End occurrences | 0000010000 |
| Accepts | 0000000000 | woman
(the right distance between substring start state and end occurrences leads to an accept)

| | |
|---|---|
| Start stream | 1000000000 |
| End occurrences | 0000010000 |
| Accepts | 0000010000 | kind
(the right distance between substring start state and end occurrences after "woman" was accepted leads to an accept)

| | |
|---|---|
| Start stream | 0000010000 |
| End occurrences | 0000000001 |
| Accepts | 0000000001 |

The system 100 matches the regular expression to the input string based on the substrings, the first stream, and the second stream (210). The system 100 can return a regular expression result based on the matching.

In conclusion, combining the possibility of maintaining a set of $k_A \le w$ of non-uniform trit counters with reset in constant amortized time per operation with the black-box extension, the system can perform regular expression matching with character class intervals using O(k log 0w/w+log k) time per character as in the bound from Theorem 1.1, counting the extra space and preprocessing needed for the character class intervals. Each character class interval C{x, y} requires a bit queue of length x and a trit counter with reset value y−x. The bit queue uses O(x) space and preprocessing time. The trit counter uses only constant space and all trit counters can be initialized in O(m) time.

Given a character the system can also determine which character classes it belongs to. To do this the system stores for each character α a list of the micro TNFAs that contains α in a character class. With each such micro TNFA the system stores a bit string indicating the character classes that contain α. Each bit string can be stored in a single word. The system can maintain these lists sorted based on the traversal order of the micro TNFAs such that each bit string can be retrieved during the traversal in constant time. Note that in the algorithm for C{=x}, the system also needs the complement of C which can be computed by negation in constant time.

The system only stores a bit string for a character α if the micro TNFA contains a character class containing α and therefore the total number of bit strings is O(m). Hence, the total space for all lists is O(m). If the system stores the table of lists by a complete table, the storage uses O(|Σ|) additional space. For small alphabets this gives a simple and practical solution. The bound of Theorem 1.2 is based on the total number of different characters in all characters classes is at most m. Hence, only O(m) entries in the table will be non-empty. With deterministic dictionaries, the system can therefore represent the table with constant time query in O(m) space after O(m log m) preprocessing. In total, the system uses O(X+m) additional space and O(X+m log m) additional preprocessing.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the regular expression principles disclosed herein can also be used to search for gene sequences in computational biology applications. Those skilled in the art will readily recognize various modifications and changes that may be made to the principles described herein without following the example embodiments and applications illustrated and described herein, and without departing from the spirit and scope of the disclosure.

We claim:

1. A method comprising:
identifying in an input string, via a processor, substrings, the substrings generated by one of a regular expression matching process and a multi-string matching process;
receiving a stream of start states for each of the substrings generated according to a regular expression matching process;
receiving a stream of end occurrences for each of the substrings generated according to the multi-string matching process;
identifying, via an algorithm, an instance where an end occurrence of a particular substring matches the start state of the particular substring, to yield a matching instance, wherein the algorithm encodes variable length gaps into the stream of start states using a number of bits proportional to an upper bound on a length of the substrings, and wherein identifying the instance where an end occurrence of a particular substring matches a start state of the particular substring is further based on a bit offset between the stream of start states and the stream of end occurrences, where the bit offset for each substring is a size of the particular substring; and
entering the matching instance as a positive substring accept state in the regular expression matching process on the input string.

2. The method of claim 1, wherein the end occurrence of one substring is the start state for another substring.

3. The method of claim 1, the method further comprising returning a regular expression result based on the matching instance entered in the regular expression matching process.

4. The method of claim 1, wherein the stream of start states and the stream of end occurrences are bit streams.

5. The method of claim 1, wherein the input string comprises one of alphanumeric characters and punctuation.

6. The method of claim 1, wherein characters in the input string represent proteins.

7. The method of claim 1, wherein the stream of start states is represented as a finite state automaton.

8. The method of claim 1, wherein the substrings have a substring length less than a length of the input string.

9. A system comprising:
a processor; and
a computer-readable storage medium having instructions stored which, when executed on the processor, cause the processor to perform operations comprising:
identifying in an input string substrings, the substrings generated by one of a regular expression matching process and a multi-string matching process;
receiving a stream of start states for each of the substrings generated according to the regular expression matching process;
receiving a stream of end occurrences for each of the substrings generated according to the multi-string matching process;
identifying, via an algorithm, an instance where an end occurrence of a particular substring matches the start state of the particular substring, to yield a matching instance, wherein the algorithm encodes variable length gaps into the stream of start states using a number of bits proportional to an upper bound on a length of the substrings, and wherein identifying the instance where an end occurrence of a particular substring matches a start state of the particular substring is further based on a bit offset between the stream of start states and the stream of end occurrences, where the bit offset for each substring is a size of the particular substring; and
entering the matching instance as a positive substring accept state in the regular expression matching process on the input string.

10. The system of claim 9, wherein the stream of end occurrences is associated with multi-string matching in the input string.

11. The system of claim 9, wherein the stream of start states is represented as a finite state automaton.

12. A computer-readable storage device having instructions stored which, when executed by a computing device, cause the computing device to perform operations comprising:
identifying in an input string substrings, the substrings generated by one of a regular expression matching process and a multi-string matching process;
receiving a stream of start states for each of the substrings generated according to the regular expression matching process, wherein the start states in the stream of start states are developed in parallel;
receiving a stream of end occurrences for each of the substrings generated according to the multi-string matching process;
identifying, via an algorithm, an instance where an end occurrence of a particular substring matches the start state of the particular substring, to yield a matching instance, wherein the algorithm encodes variable length gaps into the stream of start states using a number of bits proportional to an upper bound on a length of the substrings, and wherein identifying the instance where an end occurrence of a particular substring matches a start state of the particular substring is further based on a bit offset between the stream of start states and the stream of end occurrences, where the bit offset for each substring is a size of the particular substring; and
entering the matching instance as a positive substring accept state in the regular expression matching process on the input string.

13. The computer-readable storage device of claim 12, wherein the stream of end occurrences is associated with multi-string matching in the input string.

14. The computer-readable storage device of claim 12, the computer-readable storage device having additional instructions stored which result in the operations further comprising returning a regular expression result based on the matching instance entered in the regular expression matching process.

* * * * *